United States Patent Office 3,429,705
Patented Feb. 25, 1969

3,429,705
PROCESS FOR THE PRODUCTION OF COLORED PHOTOGRAPHIC IMAGES
Bernhard Piller and Alfred Oetiker, Basel, Switzerland, assignors to Ciba Limited, Basel, Switzerland, a Swiss Company
No Drawing. Filed June 29, 1965, Ser. No. 468,097
Claims priority, application Switzerland, July 7, 1964, 8,878/64
U.S. Cl. 96—53
Int. Cl. G03c 7/02
12 Claims

ABSTRACT OF THE DISCLOSURE

The present invention relates to the use of quinoxaline compounds free from acid groups imparting solubility in water, further substituted at the phenylene radical by an acylamino group and at the nitrogen-containing ring by hydrocarbon radicals, as dyestuff bleaching catalysts in the silver dyestuff bleaching process.

As is known, in the silver dyestuff bleaching process organic dyestuffs are bleached depending on the amount of metallic silver present, and it is generally necessary to assist bleaching by the use of catalysts. So-called dyestuff bleaching catalysts are used which, depending on their constitution, are added to a treatment bath, for example, the dyestuff bleaching bath, or are incorporated in a photographic layer. In the latter case the catalysts must not diffuse into adjacent layers during manufacture of the material or during production of the photographic images; furthermore, since they remain in the layer they must not impair the image in any way. The catalysts to be used in accordance with the present invention meet these requirements particularly well.

The present invention relates to the use of compounds free from acid groups imparting solubility in water and that correspond to the formula (1) 

in which R represents an aromatic radical further substituted by an acylamino group and which is fused to the nitrogen-containing ring in the manner indicated by the valence lines, and R′ and R″ represent hydrocarbon radicals, as dyestuff bleaching catalysts in the silver dyestuff bleaching process.

The hydrocarbon radicals R′ and R″ may be aliphatic or aromatic. They each advantageously contain not more than 6 to 7 carbon atoms. As examples there may be mentioned phenyl radicals, ethyl groups and especially methyl groups. When R′ and R″ represent methyl groups the compounds to be used as dyestuff bleaching catalysts correspond to the formula (2) 

in which R has the meaning given above.

The aromatic radical R is, for example, a naphthalene radical or preferably a benzene radical. The acylamino group bound to this radical by its nitrogen atom is a derivative, for example, of a sulfonic acid or of a carboxylic acid, and the said aromatic radical R may contain further substituents, for example, a methyl group, or it may be free from substituents. The acyl compounds may correspond to the formula (3) 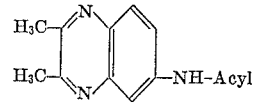

Furthermore, the acyl compounds may be derivatives of monobasic or polybasic acids. Of the derivatives of monobasic acids there may be mentioned the compounds of the formula (4) 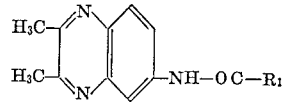

in which $R_1$ represents a benzene radical that may be further substituted or an aliphatic hydrocarbon radical, preferably a higher aliphatic hydrocarbon radical (6 to 20 carbon atoms). As examples there may be mentioned the following monocarboxylic acids that yield acyl radicals of the kind defined: fatty acids, for example, caprylic acid, lauric acid, stearic acid, benzoic acid, 4-nitrobenzoic acid (the nitro group can subsequently be reduced to an amino group), 4-aminobenzoic acid, 4-stearoylaminobenzoic acid, pyridine-3-carboxylic acid and para-toluenesulfonic acid.

The acyl compounds of polybasic acids may correspond, for example, to the formula (5) 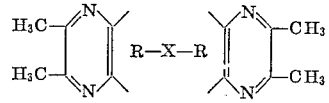

in which R represents a benzene ring fused to the nitrogen-containing ring in the manner indicated by the valence lines and X represents the radical of a diamide of an acid that is at least dibasic which radical is bound to the benzene radicals R by the amide nitrogen atoms. Advantageously they correspond to the formula (6) 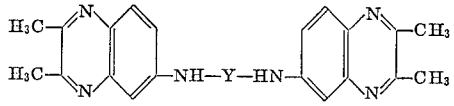

in which Y represents an acyl radical derived from a carbon-containing acid that is at least dibasic.

As examples of dibasic acids there may be mentioned: oxalic acid, succinic acid, adipic acid, sebacic acid, fumaric acid, terephthalic acid, sebacic acid diphenylamide-4:4′-dicarboxylic acid, furan-2:5-dicarboxylic acid, thiophene-2:5-dicarboxylic acid and pyridine-2:6-dicarboxylic acid.

In some cases the urea derivatives have been found to be specially valuable, that is to say, the diamides of the Formulae 5 and 6 derived from carbonic acid.

The acylamino compounds of the Formulae 1 to 5 can be obtained by known methods by acylation of the appropriate aminoquinoxalines, especially 2:3 - dimethyl - 6 - aminoquinoxaline. The acylating agent used is advantageously the halide, especially the chloride, of the acid whose acyl radical is to be introduced. The reaction is advantageously performed in an inert organic solvent at a moderately raised temperature. The acylamino compounds so obtained are generally easy to isolate from the reaction mixture and, in some cases, can be purified to a degree sufficient for the purpose described herein simply by washing with water.

The acylaminoquinoxalines of the Formula 1 so obtained can be used as dyestuff bleaching catalysts. They are added to the dyestuff bleaching bath, for example, in amounts of 10 to 50 mg. per liter of dyestuff bleaching bath. Since these compounds are virtually insoluble in water they must be converted into a state of fine division for use. This can be done, for example, by dissolving the compound to be used in an organic solvent, for example, methanol, ethanol, n-butanol, acetone or dimethyl formamide; the solution is then added to the dyestuff bleaching bath. It is also possible to use a dispersing agent. Instead of adding the catalyst to the bleaching bath it is also possible to add it to another developing or non-developing bath preceding the bleaching bath, for example, the fixing bath or a special bath.

Specially valuable results are obtained when the acylaminoquinoxalines of the Formula 1 are incorporated in the photographic layers. Accordingly, these photographic materials for the silver dyestuff bleaching process contain in at least one layer an acylaminoquinoxaline of the formula indicated above. One kilogram of an emulsion having a usual gelatine content of 8% contains about 5 to 100 mg. of catalyst.

It is possible not only to add a single catalyst of the kind indicated in this specification to a treatment bath or photographic layers, but also two or more such catalysts simultaneously, if necessary, in combination with other catalysts, for example, pyrazine, 2:3-dimethylquinoxaline which is not further substituted, 2-amino-3-oxyphenazine or other phenazines. It is therefore possible to incorporate in each dyestuff gelatine layer of three-color material those catalysts that ensure uniform and simultaneous bleaching of the layers. By choosing a suitable combination of catalysts it is also possible to change the gradation of dyestuff bleaching and adjust it as required. This applies in particular to materials in which at least one layer contains two dyestuff bleaching catalysts, at least one of which is a catalyst of the constitution indicated above. It is, of course, also possible to incorporate catalysts in the photographic layers and to add them to one or more treatment baths as well.

Unless otherwise stated, the parts and percentages in the following manufacturing processes and examples are by weight.

A. 35 parts of 2:3-dimethyl-6-aminoquinoxaline and 37 parts by volume of N:N-dimethylaniline are dissolved in 1,000 parts by volume of benzene at the boil in a closed reaction vessel provided with a vibration mixer, a reflux condenser and an inlet conduit. Phosgene is introduced for a period of 2 hours while cooling under a reflux. The product that precipitates is isolated by suction filtration at room temperature, washed with benzene and dried. The yellow to orange powder is suspended in 1,000 parts of water and the suspension is suction-filtered after 5 minutes. The residue is washed with water until the filtrate runs colorless. Recrystallization from ethanol yields about 7 parts of pale yellow to light grey prisms melting at 290° C. (with decomposition).

B. 6.5 parts of succinic acid dichloride are stirred into a boiling solution of 17 parts of 2,3-dimethyl-6-aminoquinoxaline in 500 parts by volume of acetone. The mixture is stirred for 5 minutes at boiling temperature, the precipitate that has formed is filtered off with suction and the filter residue washed with acetone. The yellow to orange colored product is suspended in 1000 parts of water and, after 5 minutes, filtered off with suction and the filter residue washed with water until suction and the the filter residue washed with water until a colorless filtrate is obtained. About 3 parts of a pink colored powder is obtained which melts at 280° C. with decomposition.

Useful bleaching catalysts are also obtained when, in an analogous manner, 2,3-dimethyl-6-aminoquinoxaline is condensed with oxalic, adipic, suberic, sebacic, fumaric, or terephthalic acid dichloride, or with furan-2,5-, thiophene-2,5- or pyridine-2,6-dicarboxylic acid dichloride. 2,3-diphenyl-6-aminoquinoxaline can be used instead of 2,3-dimethyl-6-aminoquinoxaline.

C. 19 parts by volume of caprylic acid chloride are added while stirring to a boiling solution of 17 parts of 2:3-dimethyl-6-aminoquinoxaline in 500 parts by volume of acetone; stirring is continued for 3 minutes at the boil, whereupon the reaction mixture is suction-filtered and the filter residue is washed with acetone. The yellow product is suspended in 1,000 parts of water, the oil that precipitates is crystallized, the crystals are isolated by suction filtration and then washed with water until the filtrate runs colorless. Reprecipitation from acetone in the presence of water yields about 14 parts of a yellowish powder melting at 195 to 200° C. (with decomposition).

2:3-dimethyl-6-aminoquinoxaline can be condensed in an analogous manner with lauric acid and stearic acid chloride as well as with benzoyl and para-nitrobenzoyl chloride, and the 2:3-dimethyl-6-aminoquinoxaline can also be replaced by 2:3-diphenyl-6-aminoquinoxaline.

D. A suspension of 1.6 parts of pyridine-3-carboxylic acid chloride in 20 parts by volume of acetone is added while stirring to a solution of 3 parts of 2:3-diphenyl-6-aminoquinoxaline in 40 parts by volume of acetone. Stirring is continued for 30 minutes under reflux, the reaction mixture is suctioned-filtered at room temperature and the residue is washed with 150 parts by volume of acetone. Purification is effected by suspending the product in 200 parts by volume of a mixture of water and hydrochloric acid of 37% strength (1:1), stirring the suspension for 10 minutes, suction-filtering and washing the residue with 200 parts by volume of acetone. 3.6 parts of a grey powder melting at 278 to 282° C. (with decomposition) are obtained.

E. 8.5 parts of 2:3-dimethyl-6-aminoquinoxaline are dissolved at 90 to 95° C. in 50 parts by volume of anhydrous pyridine. 10.5 parts of para-toluenesulfonic acid chloride are added and the batch is heated on a boiling water bath for 2 hours while stirring. The reaction mixture is then poured into 500 parts by volume of 2 N-hydrochloric acid, the mixture is stirred for 30 minutes, suction-filtered, and the filter residue is washed with water. 13 parts of a yellowish powder melting at 200° C. (with decomposition) are obtained.

Example 1

A red sensitizer, the usual casting additives, for example, stabilizer, wetting agent and hardening agent, as well as the cyan dyestuff of the formula (7)

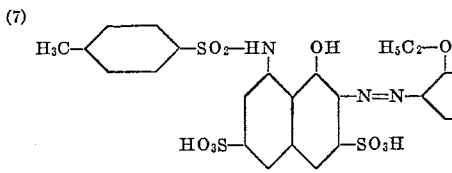 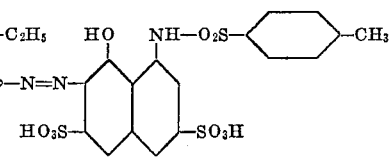

are added in the usual manner at 40° C. to 1 kg. of a highly sensitive silver bromideiodide emulsion having a gelatine content of 8%. 40 milliliters of a 0.1% solution in methanol of the bleaching catalyst of the formula (8)

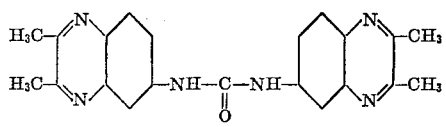

prepared according to the manufacturing process A are likewise stirred into the emulsion. The emulsion is then filtered and adjusted to the desired viscosity by the addition of water. A layer 6μ thick (when dry) is then cast on a baryta paper support (weight: 190 g. per square meter) at a casting temperature of 40° C. and at a speed of 6 meters per minute.

The material so prepared is then exposed to red light behind a neutral wedge filter, developed in a paramonomethylaminophenol sulfate - hydroquinone developer, treated in an acetic acid stop bath, washed with water for one minute and then treated in the following dyestuff bleaching bath:

| | | |
|---|---|---|
| Potassium | grams | 100 |
| Thiourea | do | 10 |
| Hydrochloric acid (37%) | ml | 70 |
| Bulked with water to | ml | 1,000 |

The material is then washed with water, the silver is rehalogenated in a copper sulfate or copper nitrate bath strongly acidified with hydrochloric acid, washed again with water, treated in a fixing bath containing sodium thiosulfate, washed again with water and then dried. The duration of treatment in the dyestuff bleaching bath should be just long enough to bleach the dyestuff completely at the areas most highly exposed; this can be determined by experiment. It has been observed that a treatment of a few minutes is sufficient. Comparatively steep color gradation is obtained. Attempts to flatten gradation by reducing the amount of catalyst lead to unsatisfactory results because complete bleaching cannot be achieved if the amount of catalyst present is too small.

As a control, a layer is produced in the manner described above but without the bleaching catalyst. This material is further processed in the same manner. Only a minute proportion of the dyestuff is bleached, even after a 30-minute treatment in the dyestuff bleaching bath.

Example 2

A layer containing the same amount of the catalyst of the formula (9)
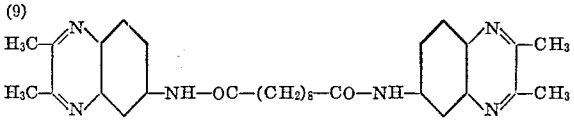

is prepared in the manner described in Example 1. Comparatively flat color gradation is obtained after processing in the manner described above. It can also be observed that complete bleaching at highly exposed areas can be achieved only with difficulty with this catalyst.

Example 3

A layer containing, per kg. of emulsion, 20 ml. of a solution of 0.1% of the catalyst of the Formula 8 and 20 ml. of a solution of 0.1% of the catalyst of the Formula 9 is prepared in the manner described in Example 1. Processing is likewise carried out in the manner described in Example 1. The color gradation obtained is between that of Example 1 and that of Example 2, and complete bleaching is obtained with ease at highly exposed areas. The 0.1% solution of the catalyst of the Formula 9 in methanol can be replaced by a 0.1% solution of the catalyst of the formula

(10)
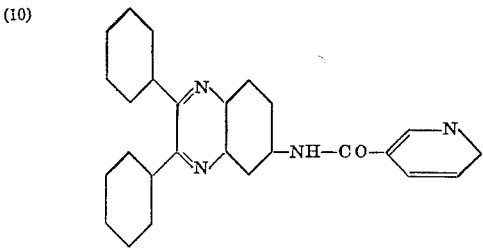

(11)
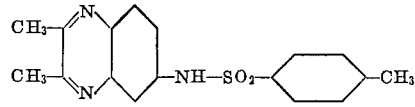

in methanol or by a 0.05% solution of the catalyst of the formula

(12)
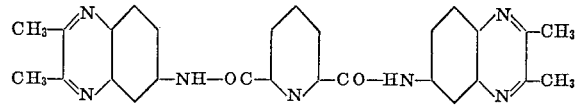

in dioxane free from peroxide.

Example 4

A silver bromide-gelatine emulsion containing the cyan dyestuff of the formula

(13)
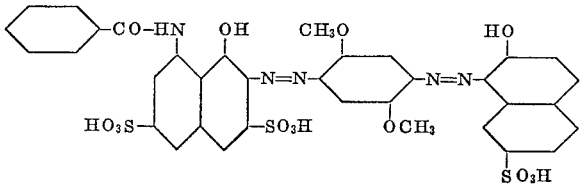

in an amount such that it gives a color density of 0.75 is applied to a cellulose acetate film provided with an adhesive layer. The film so prepared is exposed behind stepped photometric absorption wedges and then hardened, developed and fixed in the usual manner.

When the wedge is treated in a bath containing, per 1,000 parts by volume, 100 parts of potassium bromide, 10 parts of thiourea and 70 parts by volume of hydrochloric acid of 37% strength, only minute portions of the dyestuff are bleached even after a period of 30 minutes, as can be determined after removal of the residual silver in one of the usual silver bleaching baths and subsequent fixation.

However, when 50 ml. of a 0.1% solution of one of the catalysts described in the manufacturing processes A to E in a suitable organic solvent, for example, methanol, n-butanol, dioxane or dimethyl formamide, are added to the bleaching bath and the material is treated in this dyestuff bleaching bath for 2 to 10 minutes, and the material is subsequently treated in a silver bleaching bath and a fixing bath, color wedges are obtained which are the reverse of the original silver wedges and which are completely bleached at those areas where the silver was originally at maximum density.

Components of multilayer material can also be prepared by the processes described in the examples.

What is claimed is:
1. A process for the production of colored photographic images by the silver dyestuff bleaching method, which comprises dyestuff bleaching in the presence of a compound which is free from acid groups imparting solubility in water and corresponds to the formula

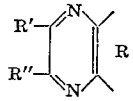

in which R represents a phenylene radical further substituted by an acylamino group and bound to the nitrogen containing ring in the manner indicated by the valence lines and R' and R" represent hydrocarbon radicals as a dyestuff bleaching catalyst.

2. A process for the production of colored photographic images by the silver dyestuff bleaching method, which comprises dyestuff bleaching in the presence of a compound which is free from acid groups imparting solubility in water and corresponds to the formula

[formula: H₃C— and H₃C— substituents on a pyrazine ring with R]

in which R represents a phenylene radical further substituted by an acylamino group and bound to the nitrogen-containing ring in the manner indicated by the valence lines as a dyestuff bleaching catalyst.

3. A process for the production of colored photographic images by the silver dyestuff bleaching method, which comprises dyestuff bleaching in the presence of a compound which is free from acid groups imparting solubility in water and corresponds to the formula

[formula: 2,3-dimethylquinoxaline—NH—Acyl]

as a dyestuff bleaching catalyst.

4. A process for the production of colored photographic images by the silver dyestuff bleaching method, which comprises dyestuff bleaching in the presence of a compound which is free from acid groups imparting solubility in water and corresponds to the formula

[formula: H₃C, H₃C–pyrazine–R–X–R–pyrazine–CH₃, CH₃]

in which R represents a benzene radical bound to the nitrogen-containing ring in the manner indicated by the valence lines and X represents the radical of a diamide of an acid that is at least dibasic, which radical is bound to the benzene radical R by its amide nitrogen atoms, as a dyestuff bleaching catalyst.

5. A process for the production of colored photographic images by the silver dyestuff bleaching method, which comprises dyestuff bleaching in the presence of a compound which is free from acid groups imparting solubility in water and corresponds to the formula

[formula: H₃C, H₃C–quinoxaline–NH–Y–NH–quinoxaline–CH₃, CH₃]

in which Y represents an acyl radical derived from a carbon-containing acid that is at least dibasic, as a dyestuff bleaching catalyst.

6. A process for the production of colored photographic images by the silver dyestuff bleaching method, which comprises dyestuff bleaching in the presence of a compound of the formula

[formula: H₃C, H₃C–quinoxaline–NH–C(=O)–NH–quinoxaline–CH₃, CH₃]

as a dyestuff bleaching catalyst.

7. A process for the production of colored photographic images by the silver dyestuff bleaching method, which comprises dyestuff bleaching in the presence of a compound of the formula

[formula: H₃C, H₃C–quinoxaline–NH–OC–(CH₂)₈–CO–NH–quinoxaline–CH₃, CH₃]

as a dyestuff bleaching catalyst.

8. A process for the production of colored photographic images by the silver dyestuff bleaching method, which comprises dyestuff bleaching in the presence of a compound of the formula

[formula: 2,3-dicyclohexylquinoxaline–NH–CO–pyridine]

as a dyestuff bleaching catalyst.

9. A process for the production of colored photographic images by the silver dyestuff bleaching method, which comprises dyestuff bleaching in the presence of a compound of the formula

[formula: CH₃, CH₃–quinoxaline–NN–SO₂–C₆H₄–CH₃]

as a dyestuff bleaching catalyst.

10. A process for the production of colored photographic images by the silver dyestuff bleaching method, which comprises dyestuff bleaching in the presence of a compound of the formula

[formula: CH₃,CH₃–quinoxaline–NH=OC–(phenyl)–CO–HN–quinoxaline–CH₃,CH₃]

as a dyestuff bleaching catalyst.

11. Photographic material for the silver dyestuff bleaching process which comprises at least one layer containing as a dyestuff bleaching catalyst an acylaminoquinoxaline of the formula

[formula: R', R''–pyrazine–R]

in which R represents a phenylene radical further substituted by an acylamino group fused to the nitrogen-containing ring in the manner indicated by the valence lines and R' and R'' represent hydrocarbon radicals.

12. Photographic material for the silver dyestuff bleaching process which comprises at least one layer containing two dyestuff bleaching catalysts of which at least one corresponds to the formula

[formula: R', R''–pyrazine–R]

in which R represents a phenylene radical further substituted by an acylamino group fused to the nitrogen-containing ring in the manner indicated by the valence lines and R' and R'' represent hydrocarbon radicals.

References Cited
UNITED STATES PATENTS

| | | | |
|---|---|---|---|
| 2,183,395 | 12/1939 | Gaspar | 96—20 |
| 2,270,118 | 1/1942 | Gaspar | 96—53 |
| 2,278,984 | 4/1942 | Gaspar et al. | 96—53 |

J. TRAVIS BROWN, *Primary Examiner.*

A. T. SURO PICO, *Assistant Examiner.*